April 7, 1964   W. C. HAMPTON   3,128,427
RADIO FREQUENCY GAS CHROMATOGRAPHY APPARATUS WITH BALLAST
COIL AND SHORTED INLET AND OUTLET CONDUITS
Filed June 6, 1960   2 Sheets-Sheet 2

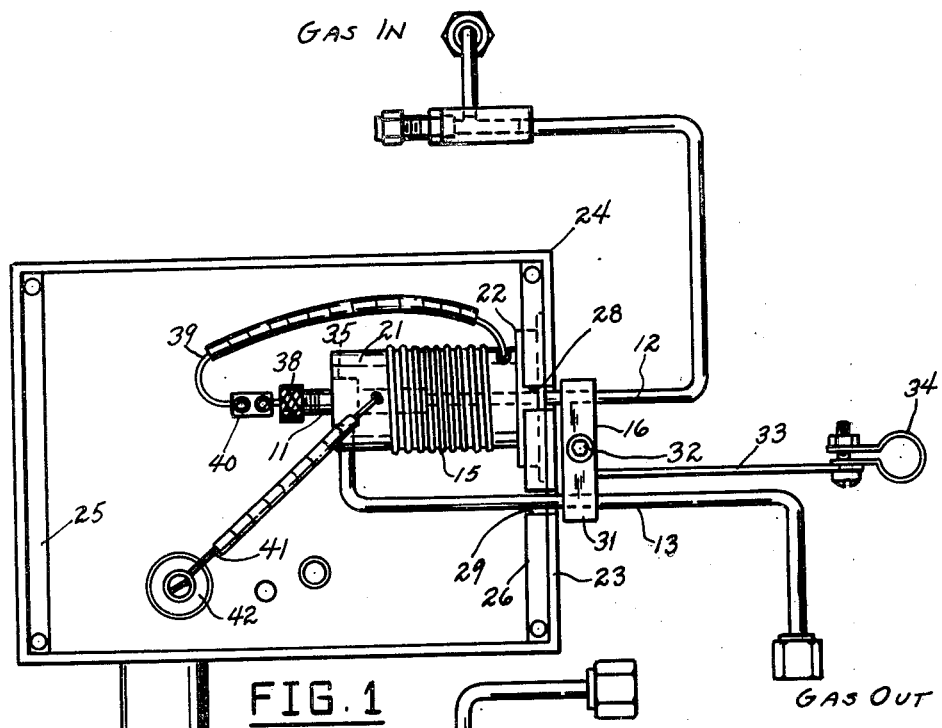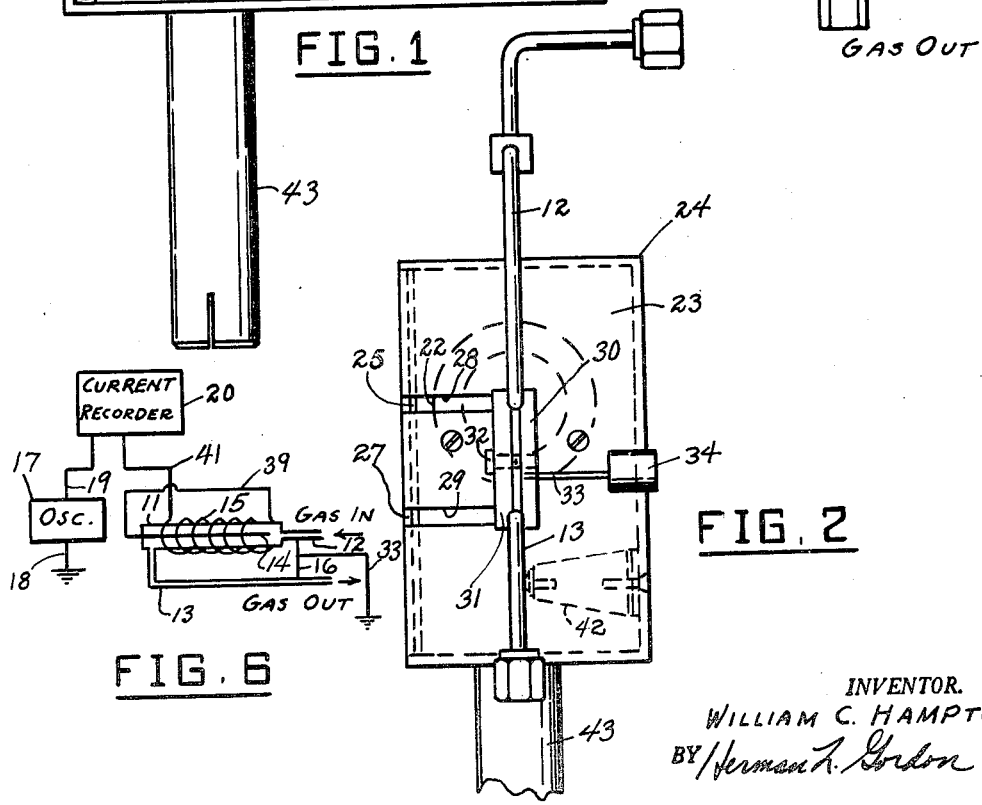

INVENTOR.
WILLIAM C. HAMPTON
BY Herman L. Gordon
ATTORNEY 3,128,427
RADIO FREQUENCY GAS CHROMATOGRAPHY APPARATUS WITH BALLAST COIL AND SHORTED INLET AND OUTLET CONDUITS
William C. Hampton, Takoma Park, Md., assignor to American Instrument Company, Inc., Silver Spring, Md.
Filed June 6, 1960, Ser. No. 34,134
7 Claims. (Cl. 324—33)

This invention relates to gas chromatography apparatus, and more particularly to a radio frequency detector cell for use in detecting components separated from a small sample mixture of gas.

A main object of the invention is to provide a novel and improved radio frequency gas detector cell for use in gas chromatography, said cell being relatively simple in construction, being stable in operation, and being highly sensitive to the presence of various components in a sample mixture of gas contained in the cell, whereby said components can be easily and accurately detected.

A further object of the invention is to provide an improved radio frequency gas detector cell for use in gas chromatography apparatus, said cell involving relatively inexpensive components, being durable in construction, being compact in size, and being substantially non-contaminating to the sample gas mixtures contained therein when in use.

A still further object of the invention is to provide an improved radio frequency detector cell for use in gas chromatography apparatus, said cell comprising only a few parts, requiring no high voltages, whereby it is safe to use, and being adaptable for use under high temperature conditions, whereby it can be safely located in an oven wherein relatively high operating temperatures are employed.

A still further object of the invention is to provide an improved radio frequency gas detector cell of the type employed with a ballast coil in series therewith to regulate the current flow when electrical discharge occurs in the gas contained in the cell, the arrangement of the ballast coil being such that the ballast coil forms an electrical field external to the cell but wherein said field is utilized to create an induced circulating current whose heating effect is employed to elevate the temperature of the cell above that produced by the electrical discharge in the gas.

A still further object of the invention is to provide an improved radio frequency gas detector cell for use in gas chromatography wherein the time required for gas ionization is substantially reduced as over previously known cells employed for a similar purpose.

A still further object of the invention is to provide an improved radio frequency gas detector cell wherein quenching action due to the entry of a foreign gas into the cell during its operation produces less change in temperature than in cells previously known, and wherein the time period of recovery of the electrical current flow through the cell is therefore lessened, and whereby sharper and more accurate gas distribution peaks are obtained because of the rapid recovery rate.

A still further object of the invention is to provide an improved radio frequency gas detector cell for use in gas chromatography apparatus wherein accumulative errors, heretofore likely when a large number of components are present in a sample of gas, are considerably reduced.

A still further object of the invention is to provide an improved radio frequency gas detector cell wherein the fall and rise of current in the cell circuit caused by changes in gas density effected by the entry of a foreign gas into the cell produces compensating corrections to the external electrical field around the cell.

A still further object of the invention is to provide an improved radio frequency gas detector cell wherein the heating effects of the electrical discharges in the cell reduce the chance of condensation of a gas in the cell chamber.

A still further object of the invention is to provide an improved radio frequency gas detector cell wherein higher temperatures above ambient can be obtained than have been heretofore available, enabling larger gas samples to be used to extract trace components.

A still further object of the invention is to provide an improved radio frequency gas detector cell wherein gaseous components having a wide range of boiling points may be accurately recorded and which provides increased base line stability and more efficient attenuation of sensitivity than in cells heretofore employed, whereby overall experimental errors are reduced.

A still further object of the invention is to provide an improved radio frequency gas detector cell assembly wherein electrical circuits external to the cell are completely shielded from radio frequency interference.

Further objects and advantages of the invention will become apparent from the following description and claims, and from the accompanying drawings, wherein:

FIGURE 1 is a front elevational view of an improved radio frequency gas detector cell assembly according to the present invention, with its cover plate removed.

FIGURE 2 is a fragmentary side elevational view of the assembly of FIGURE 1.

FIGURE 6 is a schematic circuit diagram of a gas detection system employing a gas detector cell assembly according to FIGURES 1, 2 and 3.

Figure 3:
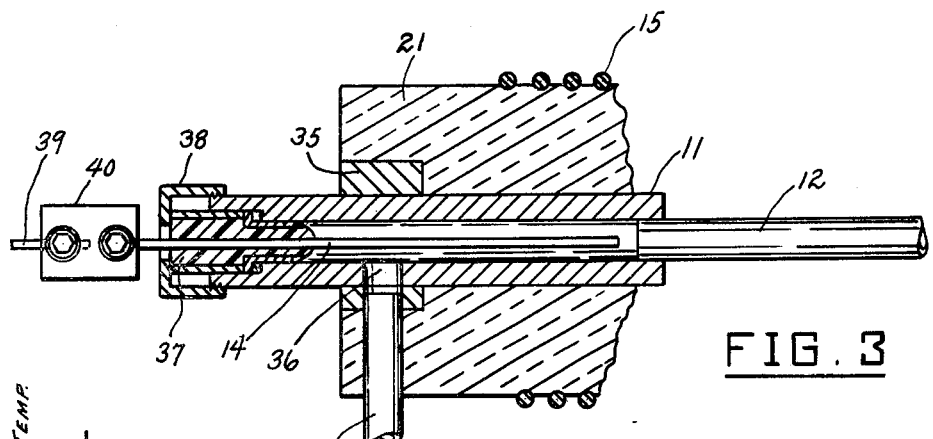
FIGURE 3 is an enlarged fragmentary vertical longitudinal cross-sectional view taken through the detector cell and a portion of its associated ballast coil, as employed in the assembly of FIGURES 1 and 2.

The radio frequency detector cell of the present invention is based on the principles of electrical discharges in gases. These discharges may be divided into two classes, namely, (1) self-sustaining, and (2) non-self-sustaining.

In the non-self-sustaining type of electrical discharge, an external aid is employed to bring a sufficient number of electrons or ions into the discharge. In the device of the present invention, this is accomplished by employing a series ballast which surrounds the cell, producing an external electric field. The ballast coil comprises a plurality of turns wound on a suitable insulating form, for example, of ceramic material, and has a resonance frequency substantially the same as the frequency of the driving oscillator. The core of this inductor consists of the cell, which may be of suitable non-corrosive conductive material, such as stainless steel, and the piping into and out of the cell, which is electrically short-circuited by a copper shorting bar. The inductor has an effective heat dissipation sufficient to raise the temperature of the gas passing through the cell to a value high enough so that some of its atoms acquire so much energy that ionization can occur through mutual collision. However, the temperature rise is not the prime factor causing ionization; said prime factor is the radio frequency field. Nevertheless, the ionization seems to start more easily at higher temperatures.

FIGURE 6 illustrates schematically a gas detection system comprising a cell 11, to one end of which is connected an inlet conduit 12 communicating with a source of sample gas. An outlet conduit 13 is connected to the opposite end portion of the cell, allowing the sampled gas to discharge. An electrode 14 is mounted substantially axially in the cell, being suitably insulated therefrom, and a ballast coil 15 surrounds the cell. The cell is electrically grounded by the short-circuiting bar 16, which is connected to ground, as shown. A suitable radio frequency oscillator 17 has one output terminal 18 thereof grounded and the other output terminal 19 connected through a current indicator and recorder 20 to one terminal of the ballast coil 15. The remaining terminal of the ballast coil is connected to the electrode 14.

As shown in FIGURES 1, 2 and 3, the ballast coil 15 comprises a suitable number of turns of wire, for example, 21 turns of 24 gage Nichrome wire, wound on a ceramic form 21 of suitable diameter, for example, 0.75 inch. The form 21 is provided with a base 22 which is secured to one end wall 23 of a rectangular metal housing 24 provided with respective inwardly extending end flanges 25 and 26 to which is removably secured a metal front cover 27. End wall 23 and flange 26 are notched away to define respective transverse slots 28 and 29 providing clearance for the inlet conduit 12 and the outlet conduit 13. The shorting bar 16 comprises a pair of metal blocks 30 and 31 clamped across the conduits 12 and 13 and secured thereto by a fastening screw 32 engaged through the center of block 31 and threadedly engaged in the center portion of block 30. The bar assembly 16 is located externally adjacent to the end wall 23, so that the major portion of the short-circuited electrical ring defined by the conduits 12 and 13, the cell 11 and the bar assembly 16 is contained within the housing 24. Bar assembly 16 is electrically connected by a conductor 33 to a ground clamp 34, which is suitably conductively fastened to a grounded object.

As shown in FIGURE 3, the cell 11 comprises a substantially cylindrical tube, in one end of which is secured the end of the gas inlet conduit 12. The tube is secured in the coil form 21 and is provided with a collar 35 in which is secured the end of the outlet conduit 13, in communication with a laterally directed port 36 formed in the tube a substantial distance from its inlet end, for the discharge of the sampled gas. The axially extending electrode 14, which may comprise gold plated wire, is mounted in an insulating collar 37 which is sealingly secured in the end of the tubular cell 11 opposite conduit 12, as by a centrally apertured annular clamping cap 38 threadedly engaged on the end portion of tubular cell 11.

One terminal of coil 15 is connected by a suitably insulated conductor 39 to the external end of electrode 14, as by a coupling block 40. The other terminal of the coil is connected by a suitably insulated conductor 41 to a high voltage terminal 42 mounted in housing 24 and adapted to be connected to the ungrounded terminal wire 19 of the driving oscillator 17.

Housing 24 is provided with a depending supporting post 43 which may be suitably mounted on the frame of the apparatus with which the cell assembly is employed.

As shown in FIGURE 3, the electrode 14 extends for the major portion of the length of the tubular cell 11 and terminates adjacent the gas inlet conduit 12.

Oscillator 17 provides a suitable radio frequency voltage, for example, at a frequency of 27 megacycles. The carrier gas, for example, helium, from the chromatograph column passes through the cell at a constant flow rate, at almost atmospheric pressure. When the voltage applied to the electrode is low, the helium gas is practically a perfect insulator, but if the voltage is increased until it reaches an ionization value, the gas suddenly becomes conductive. This transformation of the helium gas from an insulator to a conductor at low gas pressure makes it possible to produce self-sustaining currents of the order of 1 microampere and less, since here the resistance of the conductive gas amounts to many megohms. These weak currents are known as Townsend discharge. If, on the other hand, the voltage is still further increased to breakdown voltage, a spark of high current density and very short duration will occur, and the gas now becomes a very low resistance path of the order of one ohm.

In the voltage range between that which provides the Townsend discharge and that which provides the short-lived arc discharge, a third type of discharge is obtained, known as a "glow" discharge. It is this type of discharge which is employed in the cell of the present invention. The "glow" discharge is made possible by the use of a series ballast to regulate and control the current flow through the gas stream after ionization has taken place. The high intensity field at the end point of the electrode 14 gives rise to what is generally known as the "ionic wind." Ionic wind is the stream of ions and mass flow of uncharged molecules in the space between the electrode and the wall of detection. Since this field is alternating, the "wind" was found to consist of two components, namely, a steady stream away from the point (direct current), and a synchronous alternating movement.

The current through the detector cell 11 is controlled from the oscillator 17 so that the direct current component is less than 200 microamperes. This is accomplished by adjustment of the plate current of the oscillator tube. Although the mechanism of the glow discharge is relatively complicated, it somewhat resembles the Townsend discharge in that the electrons, which are the major cause of conduction through the gas, leave the cathode and form positive ions and light quanta, which strike the cathode and release electrons from it.

By measurement and observation, the direct current component has been proven to be very stable. Any change in the radio frequency current will cause a substantially similar change in the direct current component. The detector circuitry (recorder 20) utilizes this rectified direct current component to measure changes in electrical conductivity caused by any foreign gas passing through the helium carrier gas stream. The electrical conductivity change is proportional to the change in the rectified current component. This change is transmitted as a signal to the input of the recorder 20 (or any other suitable indicator) in terms of differential current change from a reference bias current.

The radio frequency rectified current will remain constant provided:

(1) The helium carrier gas stream is pure.
(2) The voltage applied to the cell electrode is constant.
(3) The temperature remains constant.
(4) The flow rate of the gas is constant.

A change in any one of these factors will cause a disturbance within the cell, which in turn will cause the rectified direct current component to change to a lesser or greater degree, depending on the conditions causing the change.

In a typical embodiment of a cell with the ballast coil 15 isolated from the cell, the self-sustaining discharge caused a heating up of the cell of approximately 15° C. above ambient temperature over a period of about 60 minutes, when the current in the cell was 200 microamperes after ionization had taken place. (See FIGURE 4.) During this time period, the current increased without readjustment of the plate current of the oscillator tube. On the other hand, when the current was maintained at a lower value after ionization occurred, the temperature rise above ambient was less. For example, as shown in FIGURE 4, at 60 microamperes, the temperature rise above ambient was 6° C. in 20 minutes.

It was found that a change in temperature to a higher level caused the detector current to increase, and vice versa, where the temperature was lowered. Similarly, increasing the flow rate of the carrier gas stream increases the detector current and reducing the flow rate reduces the detector current. When the flow rate was cut off by blanking the exhaust vent, the current fell to zero.

Figure 4:
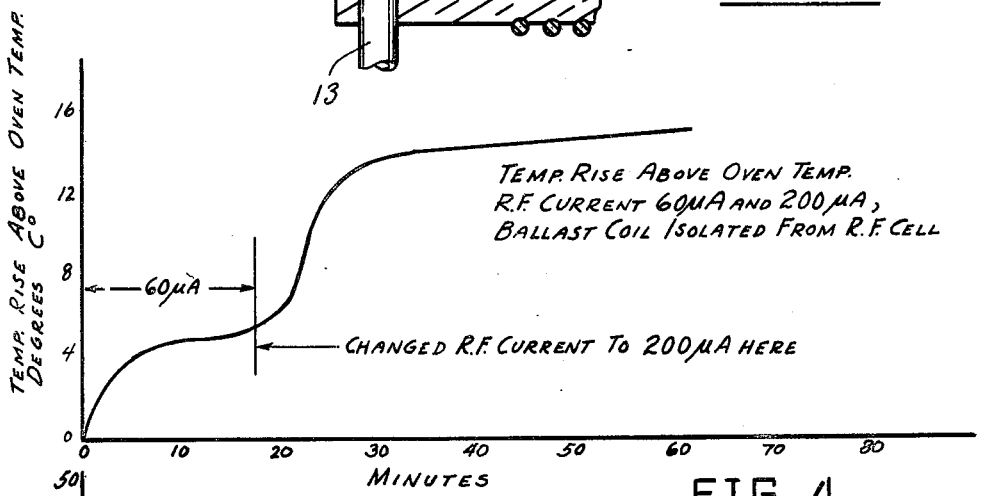
FIGURE 4 is a typical experimental curve of temperature rise versus time in a detector cell wherein the ballast coil is isolated from the detector cell, employing two different values of radio frequency current in the cell circuit.
Figure 5:
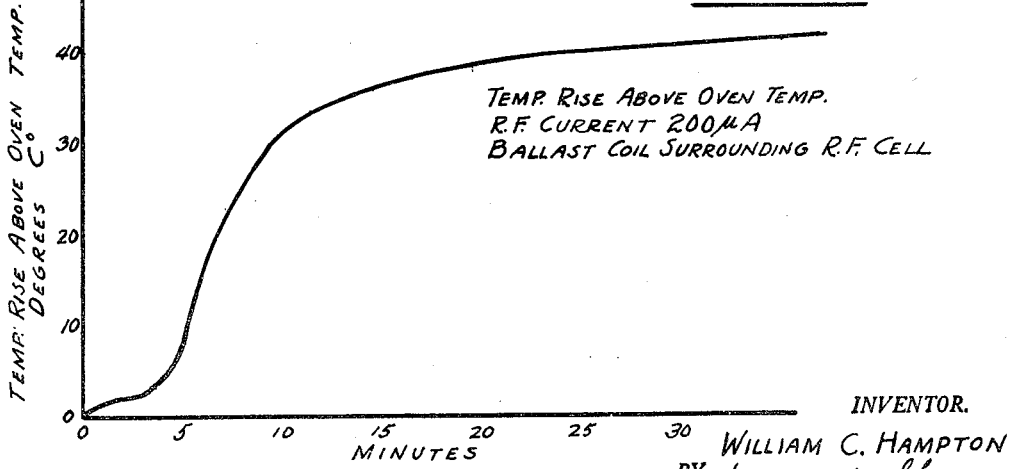
FIGURE 5 is a typical experimental curve of temperature rise versus time in a detector cell according to FIGURES 1, 2 and 3.

With the ballast coil surrounding the cell, as illustrated in FIGURES 1, 2, 3 and 6, the temperature rise above rise above ambient following ionization was very rapid, as compared with the result obtained in FIGURE 4. Thus, FIGURE 5 shows that the temperature rise above ambient after ionization, with a current of 200 microamperes at 30 minutes was about 41° C., as compared to about 14° C. in FIGURE 4.

With a stable detector cell current at a certain temperature level and a constant flow rate of helium gas, any gas entering the cell differing from the helium gas carrier cools the cell by the quenching action of the ionic stream by the different gas. This quenching action lowers the direct current component of the glow discharge to a new level, depending on the rate of cooling, the nature of the gas, and its quantity. If the detector current falls to zero, as indicated by the detector current indicating device 20, this indicates that the cell voltage is below ionization potential at the reduced temperature, and the current will not recover until the cell can heat up to the point where ionization can again occur. This change or fall in temperature will vary in magnitude according to the material passing through the cell.

In the preferred form of the invention illustrated in FIGURES 1, 2, 3 and 6, the ballast choke 15, connected electrically in series with the cell, controls and regulates the current flow and forms an electrical field external to the cell. The external electric field causes an induced current to circulate in the closed circuit comprising the conduits 12 and 13, the tubular cell body 11 and the copper shorting bar 16. The closed circuit dissipates heat and raises the temperature of the cell, under given current conditions, by a substantial amount. For example, as shown in FIGURE 5, the temperature of the cell was raised approximately 27° C. above the temperature produced by the self-sustaining discharge (approximately 15° C. above ambient in FIGURE 4), bringing the temperature level of the cell above 42° C. above ambient temperature.

Raising the temperature of the cell shortens the ionization time period to a few minutes after applying the radio frequency potential to the electrode, starting the electrons and positive ions moving earlier. When quenching action occurs in the ionic stream due to the entry of a foreign gas into the cell, the cooling effect is correspondingly reduced, and this lessens the time period required for recovery to the original current value.

The increased rate of recovery return to base line, closely approaches the rate of deflection to peak height, thereby giving a better Gaussian distribution curve; tailing off of peaks is reduced because of the rapid recovery rate.

By gold plating the cell electrode 14, the chances of surface combustion due to combination with gaseous components are substantially reduced; without this feature, serious errors in the operation of the cell would occur.

The quick recovery after a peak has been passed enables the area under the peak to be computed more accurately, whereby component volume errors are reduced. Also, when a large number of components are present in a sample of gas, accumulative errors are considerably reduced.

The fall and rise of current in the ballast coil 15, caused by changes in gas density effected by a foreign gas entering the cell, will produce compensating corrections to the external electric field.

The self-sustaining and non-self-sustaining discharge heating effects lessen the chance of condensation of a gas in the cell 11. Also, the chances of contamination of the electrode are reduced, thus increasing the life of the cell before cleaning is required; likewise, this provides longer life of the electrode.

Raising the temperature of the cell above ambient enables large samples to be used to pull out trace components.

If low boiling point gas components are present, driving the current to zero, the cell quickly recovers and the experiment is not destroyed; the higher boiling point components can still be recorded.

Better base line stability is provided, and the attenuation of sensitivity is more efficient, whereby overall experimental errors are reduced.

There is no dangerous high voltage to introduce electrical hazards; the cell assembly can be safely located in an oven air thermostat even when temperatures as high as 500° C. are experienced.

The cell and external ballast coil are mounted in a stainless steel housing 24, whereby electrical circuits external to the housing are completely shielded from radio frequency interference.

The volume of the cell can be made very small, for example, of the order of 0.1 cc., making it very adaptable for gas chromatograph determinations.

While a specific embodiment of a radio frequency detector cell has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a gas chromatography apparatus, a detection cell comprising an elongated tubular sampling chamber made of conductive material, an electrode extending through and sealingly secured in one end of said chamber and being insulated therefrom, said electrode being disposed substantially axially in said chamber, a conductive gas inlet conduit communicatively connected to the other end of the chamber, a conductive gas outlet conduit communicatively connected to said chamber a substantial distance from said other end of the chamber, a ballast coil surrounding said chamber, a radio frequency oscillator, means connecting said oscillator in circuit with said electrode and chamber through said ballast coil, and conductive shorting means connected across the inlet and outlet conduits adjacent said chamber.

2. In a gas chromatography apparatus, a detection cell comprising a gas sampling chamber made of conductive material, an electrode sealingly secured in said chamber and insulated therefrom, respective conductive gas inlet and outlet conduits communicatively connected at spaced points to said chamber, a ballast coil surrounding said chamber, a radio frequency oscillator, means connecting said oscillator in circuit with said electrode and chamber through said ballast coil, and conductive shorting means connected across said conduits adjacent said chamber.

3. A radio frequency detector cell comprising an elongated electrically conductive gas sampling chamber, a longitudinally extending electrode mounted in said chamber and insulated therefrom, a ballast coil surrounding said chamber, respective conductive inlet and outlet conduits communicatively connected to spaced portions of said chamber, conductor means connecting said ballast coil in series with said electrode and the chamber, and conductive shorting means connected across said conduits adjacent said chamber.

4. A radio frequency detector cell comprising an elongated metal gas sampling chamber, a longitudinally extending electrode secured in one end of the chamber and insulated therefrom, a body of insulating material surrounding said chamber, a ballast coil mounted on said body, a conductive gas inlet conduit communicatively connected to the other end of the chamber, a conductive gas outlet conduit communicatively connected to the chamber at a point spaced a substantial distance from said other end, conductor means electrically connecting said ballast coil in series with said electrode and chamber, and conductive shorting means connected across said conduits adjacent said chamber.

5. In a gas chromatography apparatus, a detection cell comprising an elongated conductive gas sampling chamber, a longitudinally extending electrode sealingly secured in one end of said chamber and insulated therefrom, a conductive gas inlet conduit communicatively connected to the other end of the chamber, a conductive gas outlet conduit communicatively connected to the chamber a substantial distance from said other end, a body of insulating material surrounding said chamber, a ballast coil mounted on said body, a radio frequency oscillator, a current indicating device, means connecting said oscillator, current indicating device, and ballast coil in series with said electrode and chamber, and conductive shorting means connected across said conduits adjacent said chamber.

6. In a gas chromatography apparatus, a detection cell comprising an elongated conductive gas sampling chamber, a longitudinally extending electrode sealingly secured in one end of said chamber and insulated therefrom, a conductive gas inlet conduit communicatively connected to the other end of the chamber, a conductive gas outlet conduit communicatively connected to the chamber a substantial distance from said other end, a body of ceramic insulating material surrounding said chamber, a ballast coil mounted on said body, a radio frequency oscillator, a current indicating device, means connecting said oscillator, current indicating device, and ballast coil in series with said electrode and chamber, and a conductive shorting bar connected across said conduits adjacent said chamber.

7. In a gas chromatography apparatus, a detection cell comprising an electrically conductive gas sampling chamber, electrode means in said chamber, respective conductive gas inlet and outlet conduits communicatively connected at spaced points to said chamber, a radio frequency oscillator, a coil surrounding said chamber, means connecting said oscillator in circuit with said electrode means and said coil, and conductive shorting means connected across said conduits externally of said chamber.

References Cited in the file of this patent
UNITED STATES PATENTS

| | | |
|---|---|---|
| 1,377,282 | Schafer | May 10, 1921 |
| 1,904,059 | Kubach | Apr. 18, 1933 |
| 2,544,078 | Glassbrook | Mar. 6, 1951 |
| 2,767,343 | Yaeger | Oct. 16, 1956 |
| 2,933,676 | Stokes et al. | Apr. 19, 1960 |
| 2,968,730 | Morris et al. | Jan. 17, 1961 |

FOREIGN PATENTS

| | | |
|---|---|---|
| 1,010,291 | Germany | June 13, 1957 |